United States Patent
Yaffe et al.

(10) Patent No.: US 8,013,919 B2
(45) Date of Patent: Sep. 6, 2011

(54) CMOS IMAGE SENSOR WITH INCREASED DYNAMIC RANGE BASED ON MULTIPLE EXPOSURE PERIODS OF VARYING LENGTHS

(75) Inventors: Yoel Yaffe, Modiin (IL); Eugene Fainstain, Netania (IL)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 837 days.

(21) Appl. No.: 11/769,039

(22) Filed: Jun. 27, 2007

(65) Prior Publication Data

US 2008/0158398 A1   Jul. 3, 2008

Related U.S. Application Data

(60) Provisional application No. 60/871,388, filed on Dec. 21, 2006, provisional application No. 60/805,942, filed on Jun. 27, 2006.

(51) Int. Cl.
*H04N 3/14* (2006.01)
*H04N 5/335* (2011.01)
*G03B 7/00* (2006.01)

(52) U.S. Cl. .................. 348/308; 348/362

(58) Field of Classification Search .................. None
See application file for complete search history.

(56) References Cited

U.S. PATENT DOCUMENTS

| | | | |
|---|---|---|---|
| 5,144,442 A | 9/1992 | Ginosar et al. | |
| 6,593,970 B1 * | 7/2003 | Serizawa et al. | 348/362 |
| 7,119,317 B2 * | 10/2006 | Ando et al. | 250/208.1 |
| 7,233,350 B2 | 6/2007 | Tay | 348/231.99 |
| 7,382,407 B2 * | 6/2008 | Cho et al. | 348/296 |
| 7,446,812 B2 * | 11/2008 | Ando et al. | 348/362 |
| 7,456,879 B2 * | 11/2008 | Lim et al. | 348/243 |
| 7,511,752 B2 * | 3/2009 | Kurane | 348/296 |
| 7,554,588 B2 * | 6/2009 | Yaffe | 348/297 |
| 2006/0192873 A1 | 8/2006 | Yaffe | |
| 2007/0285526 A1 * | 12/2007 | Mann et al. | 348/222.1 |
| 2009/0073293 A1 * | 3/2009 | Yaffe et al. | 348/297 |

* cited by examiner

*Primary Examiner* — Justin P Misleh
(74) *Attorney, Agent, or Firm* — Harness, Dickey & Pierce, P.L.C.

(57) ABSTRACT

A method of increasing the dynamic range of a captured image using a pixel array having a plurality of rows includes reading first pixel information corresponding to a long integration period from each pixel of a first row, reading second pixel information corresponding to a short integration period from each pixel of the first row, and merging the first pixel information and the second pixel information to thereby produce wide dynamic range pixel information for each pixel of the first row. Reading first pixel information takes place during a first interval, reading second pixel information takes place during a second interval, and at least a portion of the second interval takes place during a long integration period corresponding to a second row of the pixel array.

19 Claims, 8 Drawing Sheets

CMOS IMAGE SENSOR WITH INCREASED DYNAMIC RANGE BASED ON MULTIPLE EXPOSURE PERIODS OF VARYING LENGTHS

CROSS-REFERENCES TO RELATED APPLICATIONS

This application is a non-provisional, and claims the benefit, of commonly assigned U.S. Provisional Application No. 60/871,388, filed Dec. 21, 2006, entitled "CMOS Image Sensor With Increased Dynamic Range," and U.S. Provisional Application No. 60/805,942, filed Jun. 27, 2006, entitled "CMOS Image Sensor With Increased Dynamic Range," the entirety of each of which is herein incorporated by reference for all purposes.

This application is related to co-pending, commonly-assigned U.S. patent application Ser. No. 11/345,642, filed Jan. 31, 2006, entitled "Dual Exposure For Image Sensors," which is hereby expressly incorporated by reference in its entirety for all purposes.

FIELD OF THE INVENTION

This invention relates to the field of CMOS Image Sensors (CIS), and, in particular to methods for increasing the dynamic range of CIS, using dual exposure techniques.

BACKGROUND OF THE INVENTION

It is known (e.g., U.S. Pat. No. 5,144,442) that the dynamic range of captured images (both still and video) may be increased by acquiring multiple images of the same scene then merging the multiple images into a single wide dynamic range image. This may be accomplished using multiple image sensors and/or by using sequential image acquisitions, with different exposure settings. The former is expensive, not only because of the need for multiple image sensors, but also because the two image sensors need to be optically aligned with great precision so that the image of any object in front of the lens will be projected on the same pixel row and column in both image sensors. The latter is cheaper; however, because the two acquisitions do not take place at the same time, this approach is highly susceptible to motion artifacts.

Previously-incorporated U.S. patent application Ser. No. 11/345,642 discloses methods to generate short and long exposures of an image for the purpose of expanding its dynamic range, without the need to duplicate the number of image sensors, or to acquire two images at two different timing instances. However, further improvements are desirable.

BRIEF SUMMARY OF THE INVENTION

Embodiments of the invention provide a method of increasing the dynamic range of a captured image using a pixel array having a plurality of rows. The method includes reading first pixel information corresponding to a long integration period from each pixel of a first row, reading second pixel information corresponding to a short integration period from each pixel of the first row, and merging the first pixel information and the second pixel information to thereby produce wide dynamic range pixel information for each pixel of the first row. Reading first pixel information takes place during a first interval, reading second pixel information takes place during a second interval, and at least a portion of the second interval takes place during a long integration period corresponding to a second row of the pixel array.

In some embodiments at least a portion of the first interval may take place during the long integration period corresponding to the second row of the pixel array. Merging the first pixel information and the second pixel information may include, for each pixel, comparing the first pixel information to a predetermined threshold value, setting the wide dynamic range pixel information to be the first pixel information if the first pixel information is less than or equal to the threshold value, and setting the wide dynamic range of the pixel information to be a multiple of the second pixel information if the first pixel information is greater than the threshold value. The multiple may be equal to a ratio of the long integration period to the short integration period. The pixel array may be a CMOS array. The method may include reading third pixel information corresponding to a medium integration period for each pixel of the first row. The medium integration period may take place during a single line scan of the first row.

Other embodiments provide an image sensor having a pixel array having a plurality of rows, each row having a plurality of pixels, and a controller configured to cause each pixel of each row to integrate first pixel information over a long integration period and second pixel information over a short integration period. The controller is further configured to cause at least a portion of the short integration period for a row to take place during a long integration period of a second row. The sensor also includes an arrangement configured to determine wide dynamic range pixel information for each pixel based on the first pixel information and the second pixel information.

In some embodiments the controller is further configured to cause at least a portion of the long integration period for the row to take place during a long integration period of a second row. The arrangement configured to determine wide dynamic range pixel information for each pixel based on the first pixel information and the second pixel information may be configured to determine wide dynamic range pixel information for each pixel based on the first pixel information and the second pixel information by comparing the first pixel information to a predetermined threshold value, setting the wide dynamic range pixel information to be the first pixel information if the first pixel information is less than or equal to the threshold value, and setting the wide dynamic range of the pixel information to be a multiple of the second pixel information if the first pixel information is greater than the threshold value. The multiple may be equal to a ratio of the long integration period to the short integration period. The pixel array may be a CMOS array. The controller may be further configured to cause each pixel of each row to integrate third pixel information over a medium integration period wherein the medium integration period takes place during a single line scan of the first row.

Still other embodiments provide an image sensor having means for reading first pixel information corresponding to a long integration period from each pixel of a first row, means for reading second pixel information corresponding to a short integration period from each pixel of the first row, and means for merging the first pixel information and the second pixel information to thereby produce wide dynamic range pixel information for each pixel of the first row.

In some embodiments, the step of reading first pixel information takes place during a first interval, the step of reading second pixel information takes place during a second interval, and at least a portion of the second interval takes place during a long integration period corresponding to a second row of the pixel array. At least a portion of the first interval may take place during the long integration period corresponding to the second row of the pixel array. The means for merging the first pixel information and the second pixel information may include means for comparing the first pixel information to a predetermined threshold value for each pixel, means for setting the wide dynamic range pixel information to be the first pixel information if the first pixel information is less than or equal to the threshold value, and means for setting the wide dynamic range of the pixel information to be a multiple of the second pixel information if the first pixel information is greater than the threshold value. The multiple is equal to a ratio of the long integration period to the short integration period. The pixel array may be a CMOS array. The image sensor may include means for reading third pixel information corresponding to a medium integration period for each pixel of the first row, wherein the medium integration period takes place during a single line scan of the first row.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
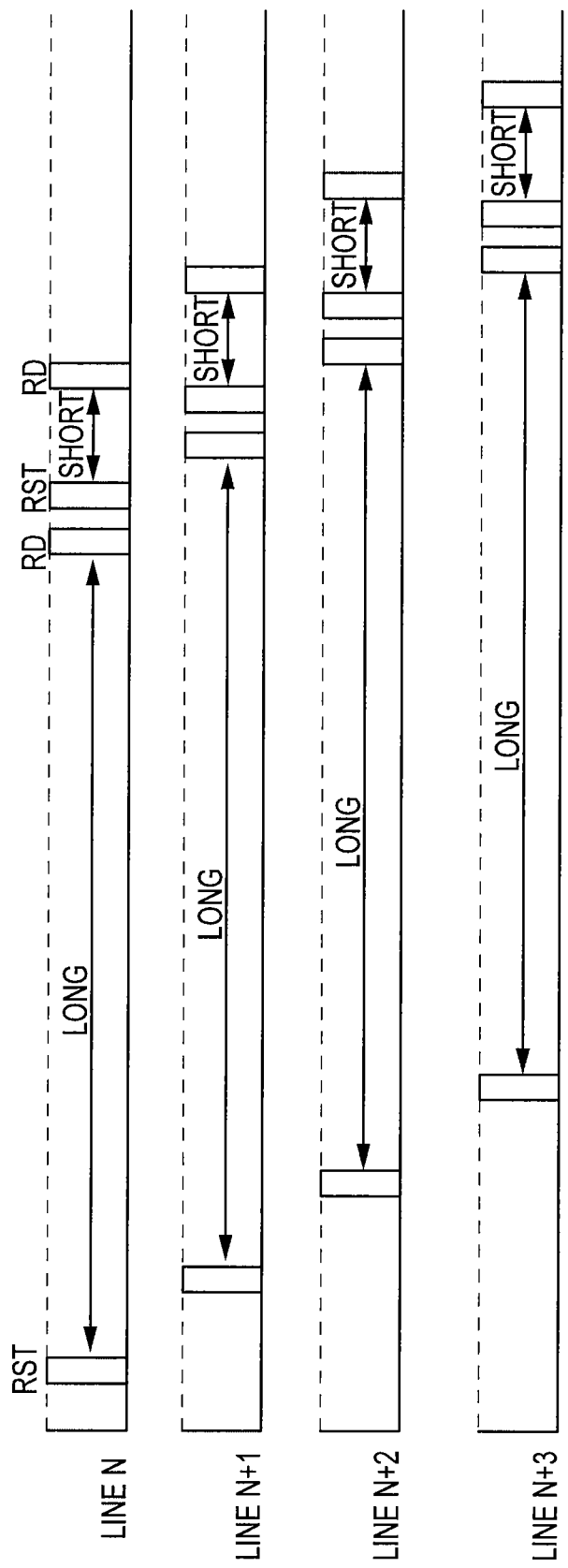
FIG. 1 depicts basic timing waveforms for four rows of a dual exposure image sensing technique according to embodiments of the present invention.

Embodiments of the present invention relate to image sensors. In order to provide a context for describing embodiments of the present invention, embodiments of the invention will be described herein with reference to CMOS Image Sensors (CIS). Those skilled in the art will appreciate, however, that other embodiments are possible.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is to be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems may be shown in block diagrams in order not to obscure the embodiments in unnecessary detail. In other instances, well-known processes, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

A CIS-based camera typically adjusts the exposure level based on the brightness of the image to be captured. If the exposure is too long, some of the pixels—in particular those in the brighter areas of the image—tend to reach saturation—a point where they can no longer integrate light energy. Image regions with such over-exposed pixels are referred to as saturated regions, and pictures with large saturated regions are considered to be of low quality. On the other hand, when the exposure time is too short, the energy accumulated in some of the pixels—in particular those in the darker areas of the image—will be low relative to the energy of the inherent noise, resulting in poor SNR and, again, poor image quality.

According to embodiments of the invention, the dynamic range of images captured using CMOS image sensors is improved using dual exposure techniques. According to embodiments of the present invention, a shorter exposure period for a line (row) is accomplished immediately following an integration and readout of the line. This minimizes the buffer needed as compared to other dual exposure techniques. According to embodiments of the present invention, a buffer need only puffer the duration of the shorter exposures, which may be several lines in some embodiments, one line in other embodiments, and no buffer in yet other embodiments.

An apparatus built in accordance with the present invention follows the long exposure period of each row by a short exposure period of the same row, with duration of one line or less. Then, the short exposure row readout is merged with the long exposure readout shortly after the long exposure row has been registered, with a minimal or with no extra buffering. Further embodiments of the current invention allow more than two exposures of each row, for example, a Long, a Short and a Medium exposure.

In a first embodiment of the current invention, row conversions are done at twice the rate of row readout. The Short exposure proceeds until the analog to digital conversion of the long exposure is completed. Thereafter, the short exposure information is latched and converted to digital. The conversion completes before the next row is to be latched. The results of the long and short exposures of the current row are merged and output.

As the conversion of the long and short exposures is done serially in this first embodiment, the conversion circuits may be shared by the long and short exposure, and no extra buffer memory or ADC circuits are needed.

In a second embodiment, conversion of the long exposure takes the time of a full row scan, but the conversion of the short exposure takes half the time period of a row. This embodiment improves picture noise, but may require duplication of analog latching and conversion circuits. The buffer memory does not need to be duplicated, as the information on both exposures is ready at the same time.

In a third embodiment, both conversions take the time duration of a full row. This case yields the best image quality, but may require duplication of the conversion circuit as well as a full row buffer.

In other embodiments, each row is subject to three or more exposures of varying durations, for wider dynamic range and better SNR.

Having described embodiments of the present invention generally, attention is directed to FIG. 1, which depicts a basic timing waveforms of the present invention for four consecutive rows ("lines"). As can be seen, a first reset pulse (RST) for each row designates the start of a long integration period. Following this period, the row is read (RD), reset again for a short exposure period, and read. This process, shifted in time, repeats for subsequent rows, employing a "rolling shutter" technique.

For double sampling CMOS image sensors, a read process includes a series of events: resetting a floating diffusion; a first read; a transfer of a photodiode charge to the floating diffusion; and a further read. For the sake of clarity, this is not shown herein. It should be assumed that for those cases, the reset pulse shown includes a series of pulses similar in nature to the one described above.

Figure 2:
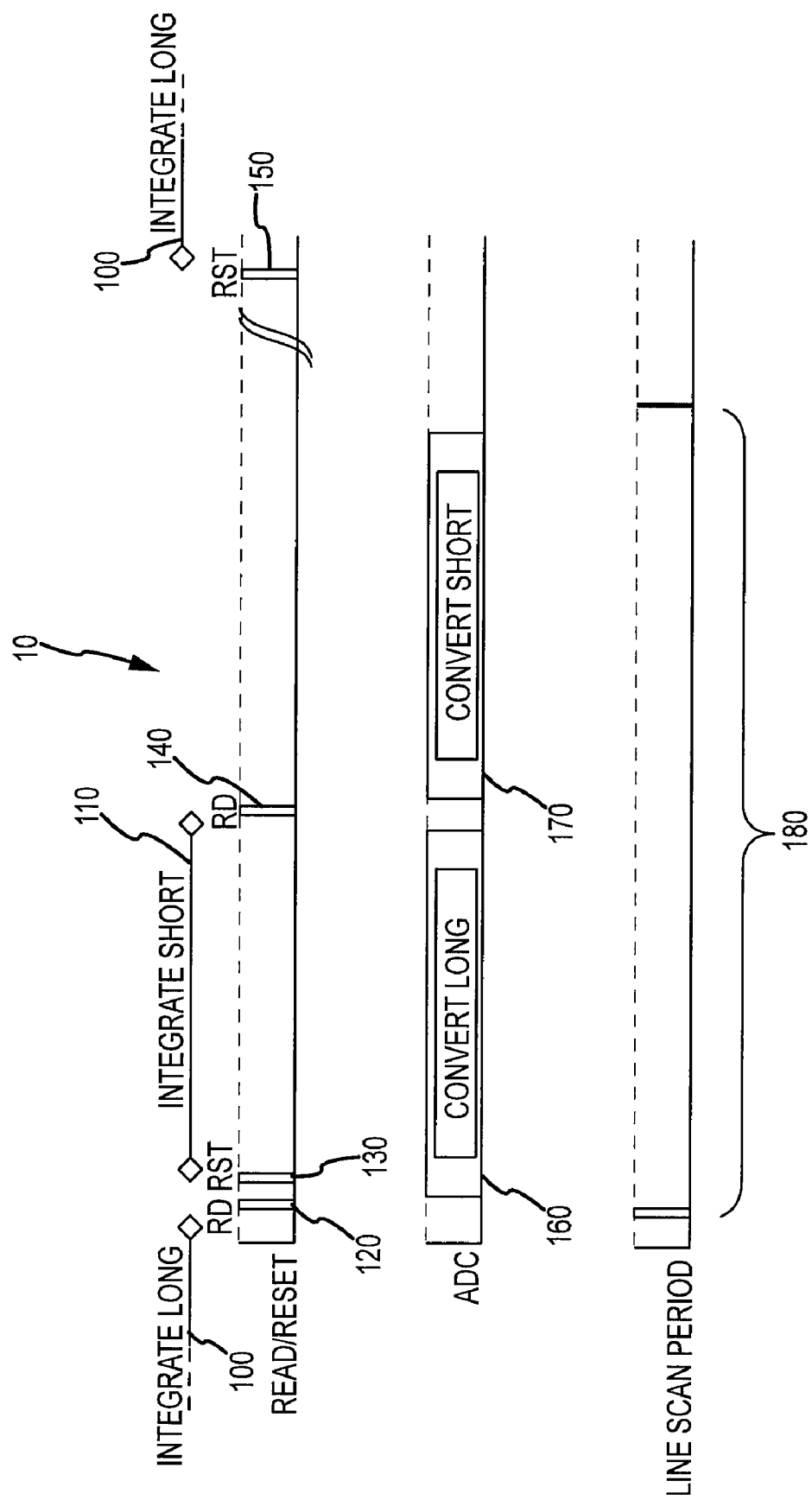
FIG. 2 depicts timing waveforms for a first specific example.

FIG. 2 depicts timing waveforms 10 for a first specific example of a dual exposure embodiment, including Read (Rd) and Reset (Rst) pulses for a single line and the corresponding integration and analog-to-digital conversion (ADC) periods. A line scan period 180 is depicted for reference. A long integration period 100 is accomplished mostly outside the time frame covered by waveforms 10, and starts before the current line is read. A read pulse 120 initiates reading of the long integration 100 into sample and hold (S&H) circuits. Shortly after long integration values are read, analog signals are converted to digital values during an ADC conversion period 160. A read pulse 120 is followed by a reset pulse 130, which starts the Short integration period 110. A read pulse 140 samples the result of the short integration period, which is then converted to digital (170).

Figure 3:
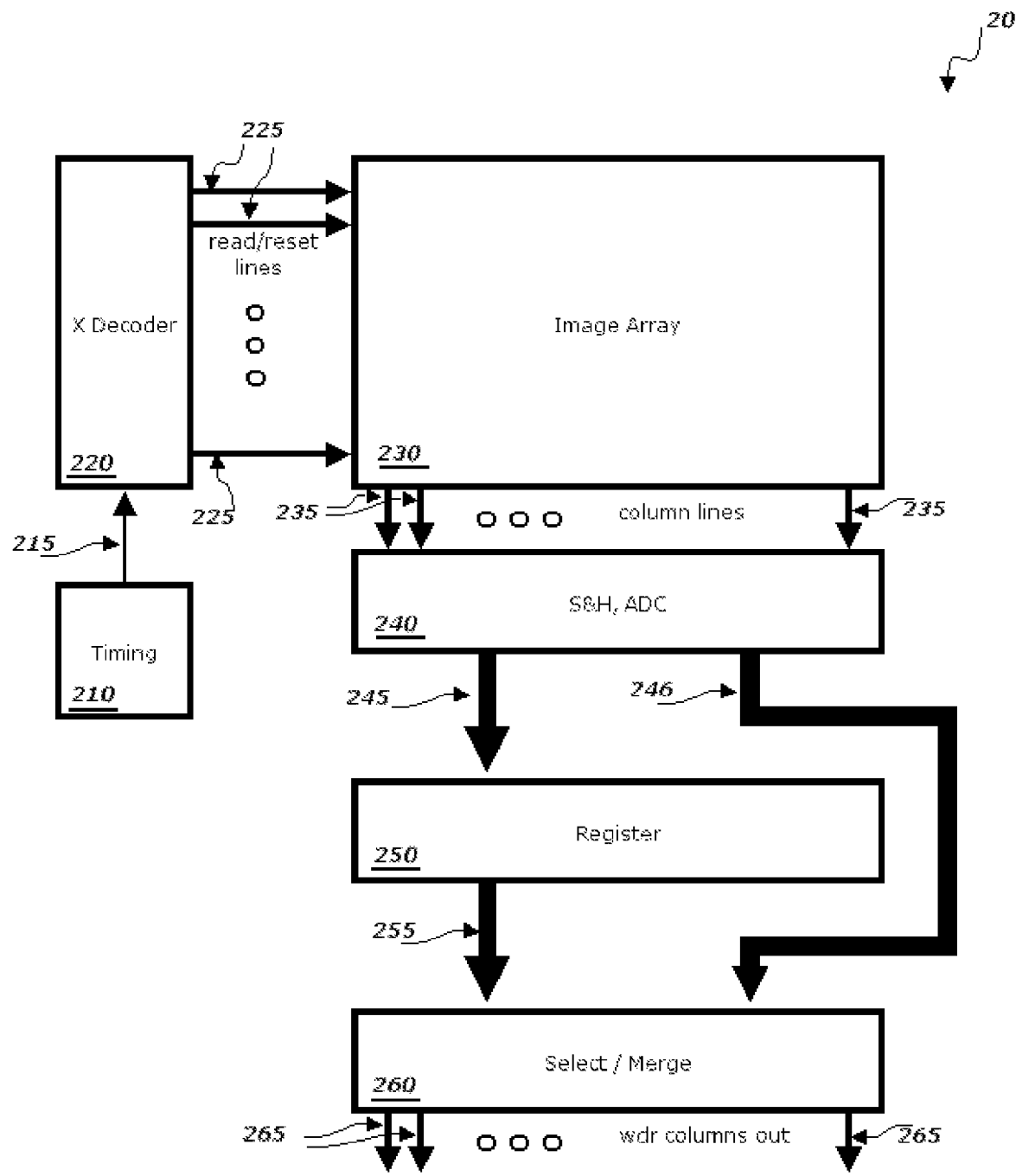
FIG. 3 depicts a schematic block diagram for implementing the first specific example.

FIG. 3 depicts a schematic block diagram 20 in which the first specific example of the present invention may be embodied. A timing unit 210 controls an X decoder 220 through control lines 215, causing it to generate Read and Reset pulses on a multitude of Read and Reset lines 225, each corresponding to a row or to groups of adjacent rows in Image Sensor Array 230, according to the timing diagram described above. Outputs 235 from Image Sensor Array 230, each corresponding to the signal read on a specific column, are Sampled and converted to digital in S&H and ADC block 240. This process is typically done in parallel for all columns.

For the Long exposure, digital value from block 240 is output, through parallel bus 245, to register 250, where it is stored until the end of the line, and output on parallel bus 255. When conversion of the short exposure data is completed, it is output from 240 via parallel bus 246. A Select Merge block 260 generates a high dynamic range image 265 from the Long exposure information asserted on bus 255 and the short exposure image asserted on bus 246.

The Select/Merge function may be, in some embodiments, a simple algorithm where the Long exposure image is transferred if its value is less than a pre-defined or a programmable threshold. Otherwise, the output value may be a multiple (G) of the Short exposure value, where G may be the exposure ratio between the Long and the Sort exposures.

Figure 4:
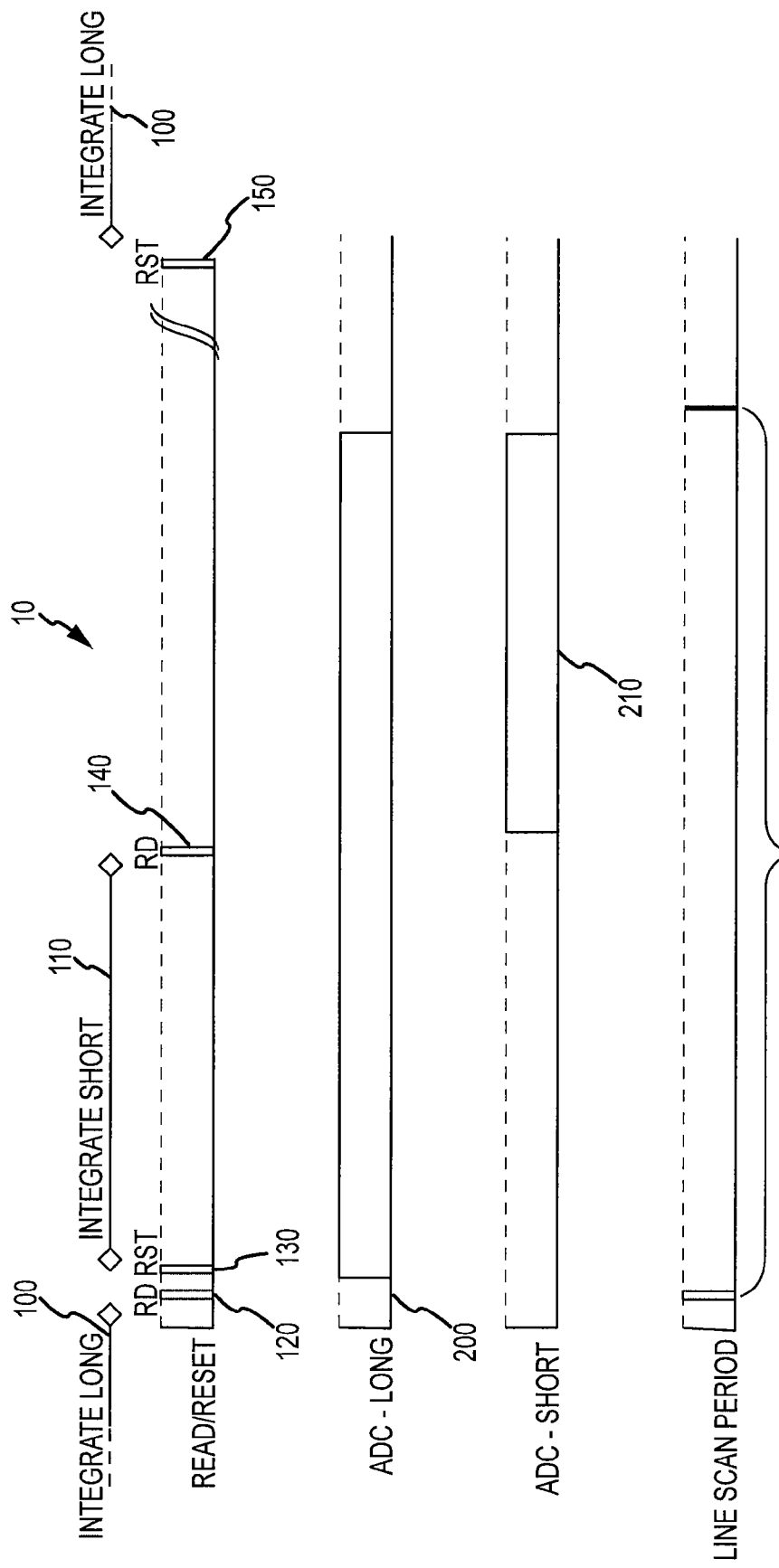
FIG. 4 depicts timing waveforms for a second specific example.

Waveforms for a second specific example are depicted in FIG. 4. In this example, a Long Integration period 100 take place mostly outside the time frame covered by 10, and starts before the current line is read. A read pulse 120 initiates reading of the Long integration 100 into S&H circuitry. Shortly after long integration values are read, a Long Exposure ADC conversion 200 starts, converting the read value to digital. A Read pulse 120 is followed by a Reset pulse 130, which starts the Short integration period 110. A Read pulse 140 samples the result of the short integration period, which is next converted to digital in a different circuit, during period 210. The results of the two conversions are ready to be merged before the end of the line.

Figure 5:
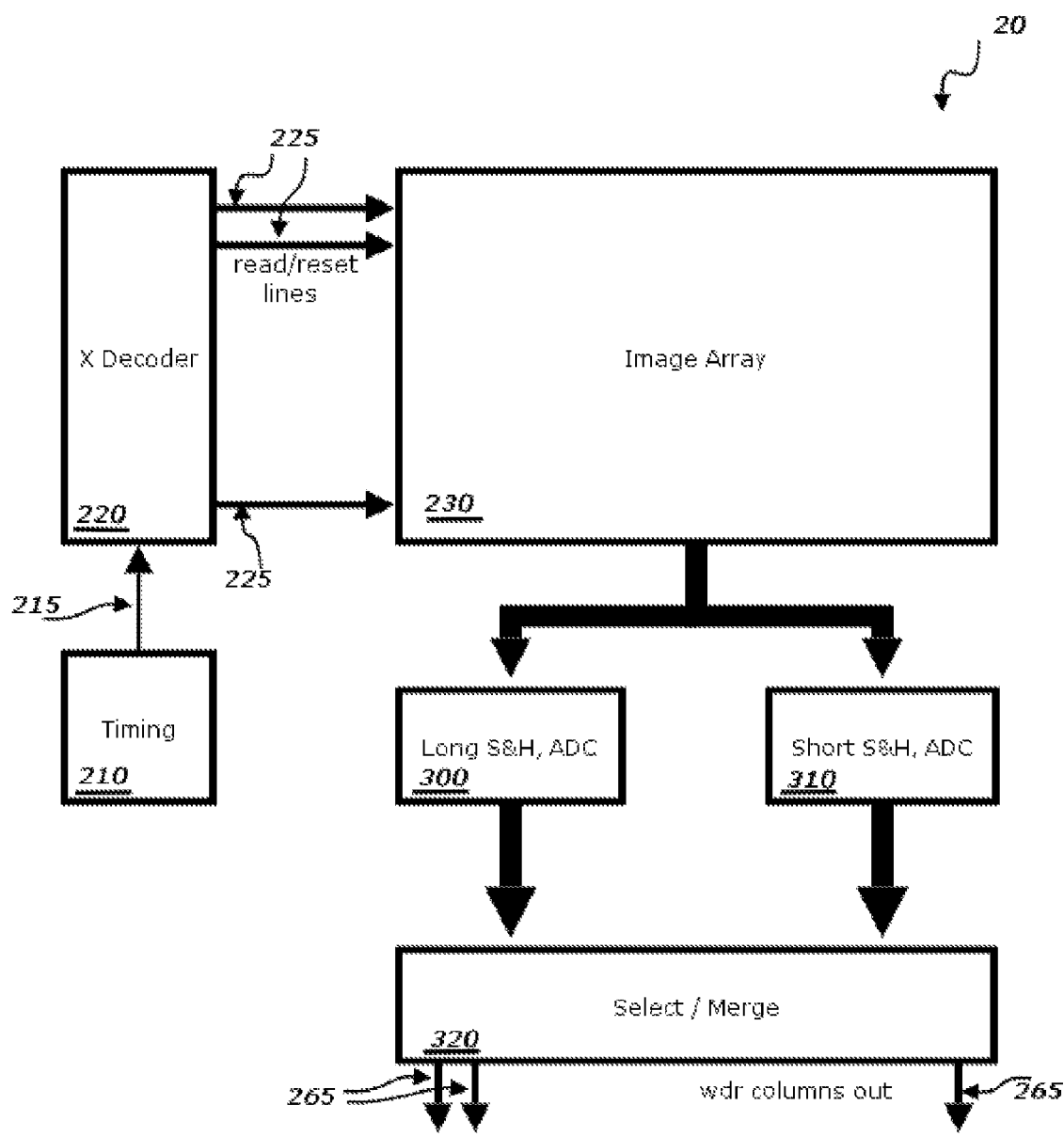
FIG. 5 depicts a schematic block diagram for implementing the second specific embodiment.

FIG. 5 depicts a schematic block diagram 20 implementing the second specific example. Similar to the first specific example, a Timing Unit 210 controls an X Decoder 220 through control lines 215, causing the X decoder to generate Read and Reset pulses on a multitude of Read and Reset lines 225, each corresponding to a row or to groups of rows in Image Sensor Array 230, according to the timing diagram described above. The outputs of Image Sensor Array 230, each corresponding to the signal read on a specific column, are Sampled and converted to digital, first in S&H and ADC block 300, and half a line later, by S&H and ADC block 310. The former is done for the Long Exposure and the latter for the Short Exposure. As illustrated in FIG. 4, the conversion done by block 300 for the Long Exposure and that done by block 310 for the Shot Exposure finish around the same time. A Select/Merge block 320 combines the two outputs to wide dynamic range (WDR) columns 265 in a process which may be similar to that described above for the first specific example.

Figure 6:
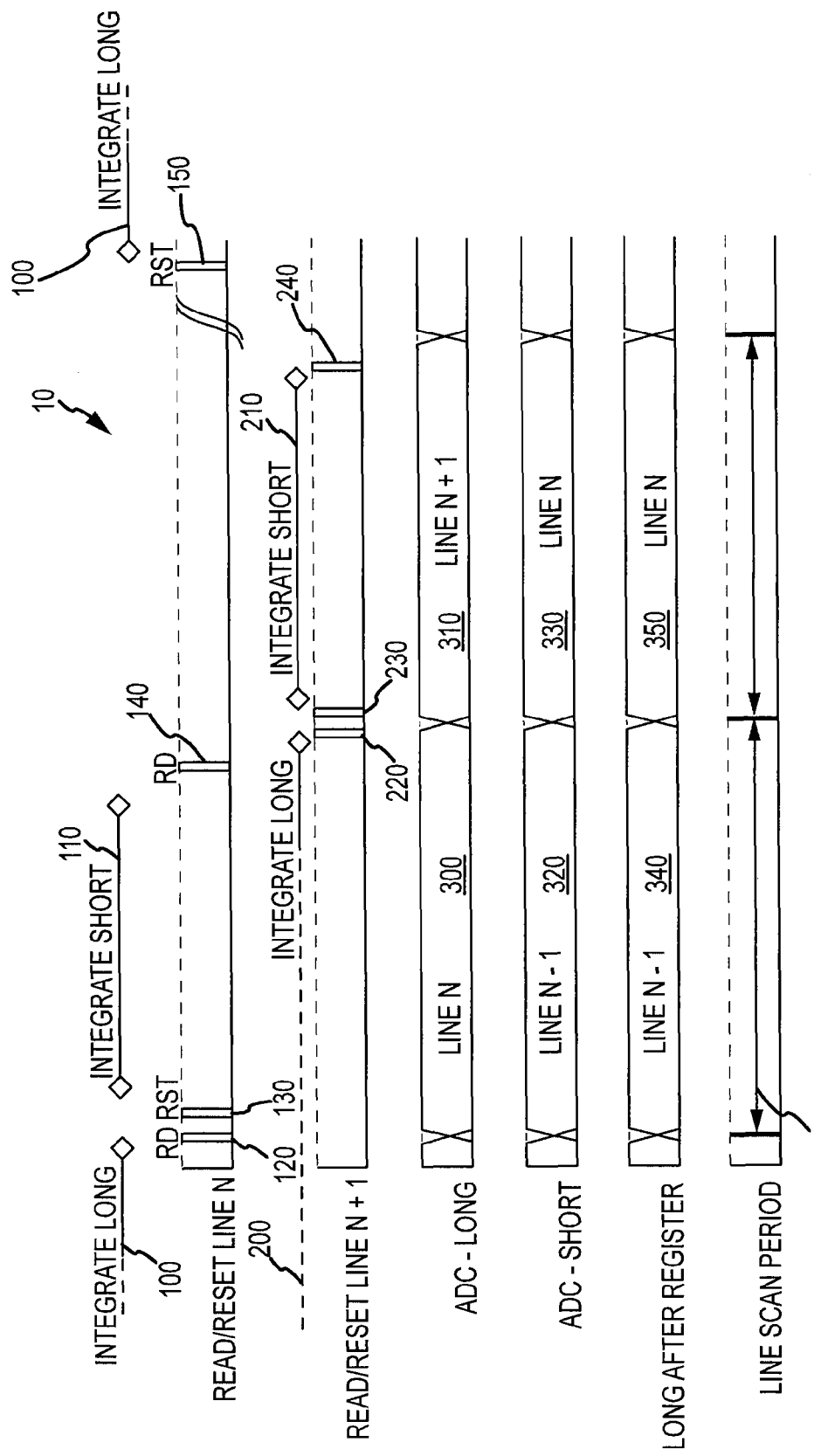
FIG. 6 depicts timing waveforms for a third specific example.

FIG. 6 depicts timing waveforms 10 for a third specific example. Unlike the previous examples, conversions for both Long and Short integrations take a full row scan time 180, and FIG. 6 depicts a period of two lines rather than one. The Long Integration Time 100 for Line n ends with a Read pulse 120, causing the signal on the column lines to start ADC conversion 300. Soon thereafter, Reset pulse 130 is applied, initiating short integration period 110 for Line n. At the end of the current line, Line n+1 finishes its long integration with Read pulse 220, and starts ADC conversion 310. At approximately the same time, short integration period 110 for line n ends. The short exposure value is read by pulse 140 and starts ADC conversion 320. Reset pulse 230 is applied to line n+1 shortly thereafter, to initiate short exposure 210.

The two steps described above repeat for all rows so that one line finishes long integration and starts short integration while another line finishes short integration and begins long integration. In a similar manner, there will always be a Long integration ADC conversion of consecutive lines, and Short integration ADC conversions of same consecutive lines, lagging the first conversion by one line.

Figure 7:
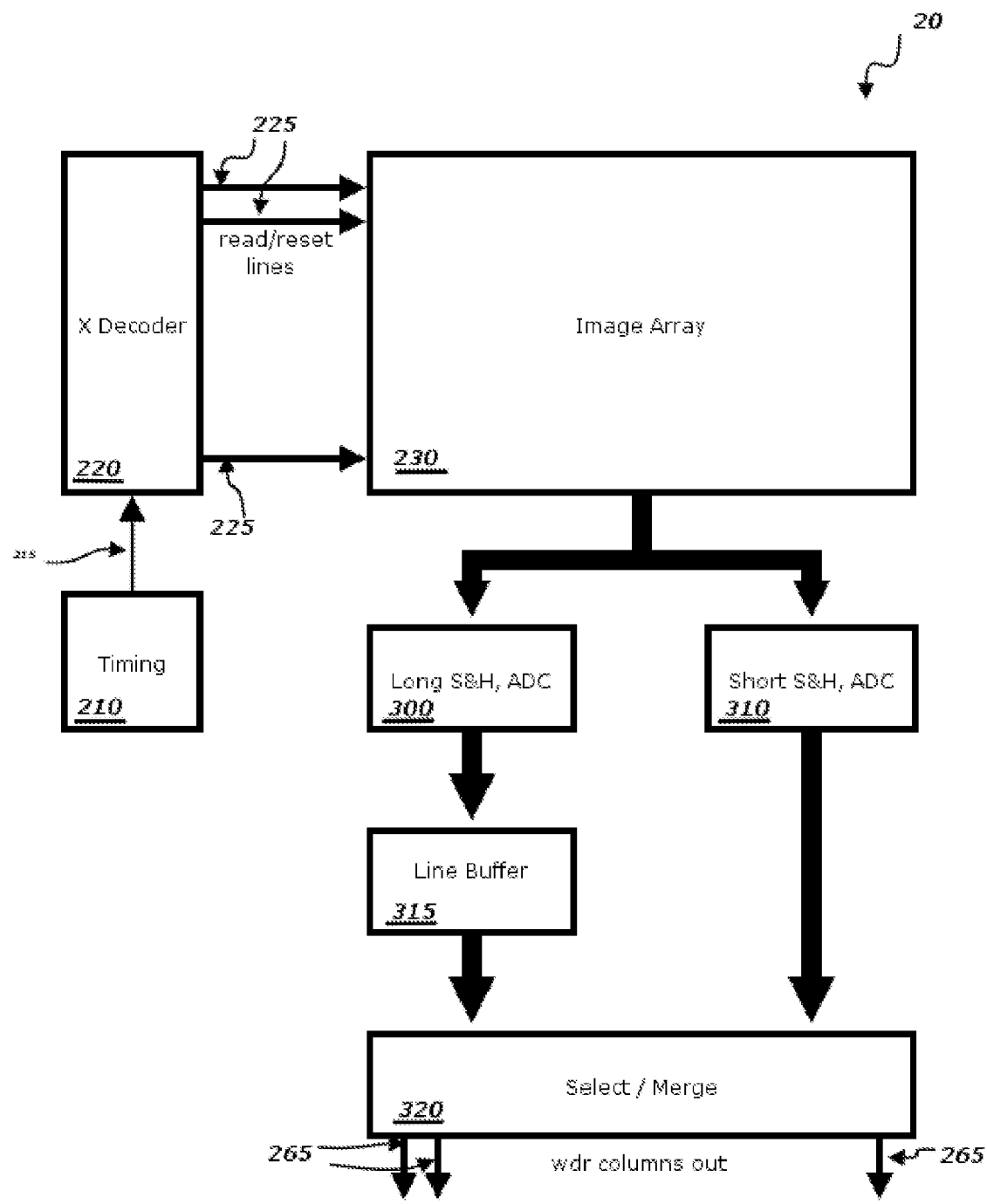
FIG. 7 depicts a schematic block diagram for implementing the third specific embodiment.

FIG. 7 depicts a conceptual block diagram of the third specific example. FIG. 7 is identical to FIG. 5, with an extra line buffer 315. Line Buffer 315 is needed because the Short exposure conversion lags after the Long exposure conversion by a full line.

In still other embodiments, each row may be subject to more than two exposures. In one such embodiment, an image sensor has 1024 video rows. There are three exposure times: a short exposure time of one row, a medium exposure time of 32 rows, and a long exposure time of 1024 rows, or full frame. Each row is subject to the three exposure times sequentially—first the Long exposure, then the Medium and lastly the Short.

A buffer of 33 video lines may be required to store the results of the Long exposure, and a buffer of one video line may be required to store the results of the medium exposure. The results of the three exposures are merged when the results of the Short exposure are obtained from an analog to digital conversion. The results from the Long and Medium exposures are read from the 33 and 1 line buffers, respectively.

Figure 8:
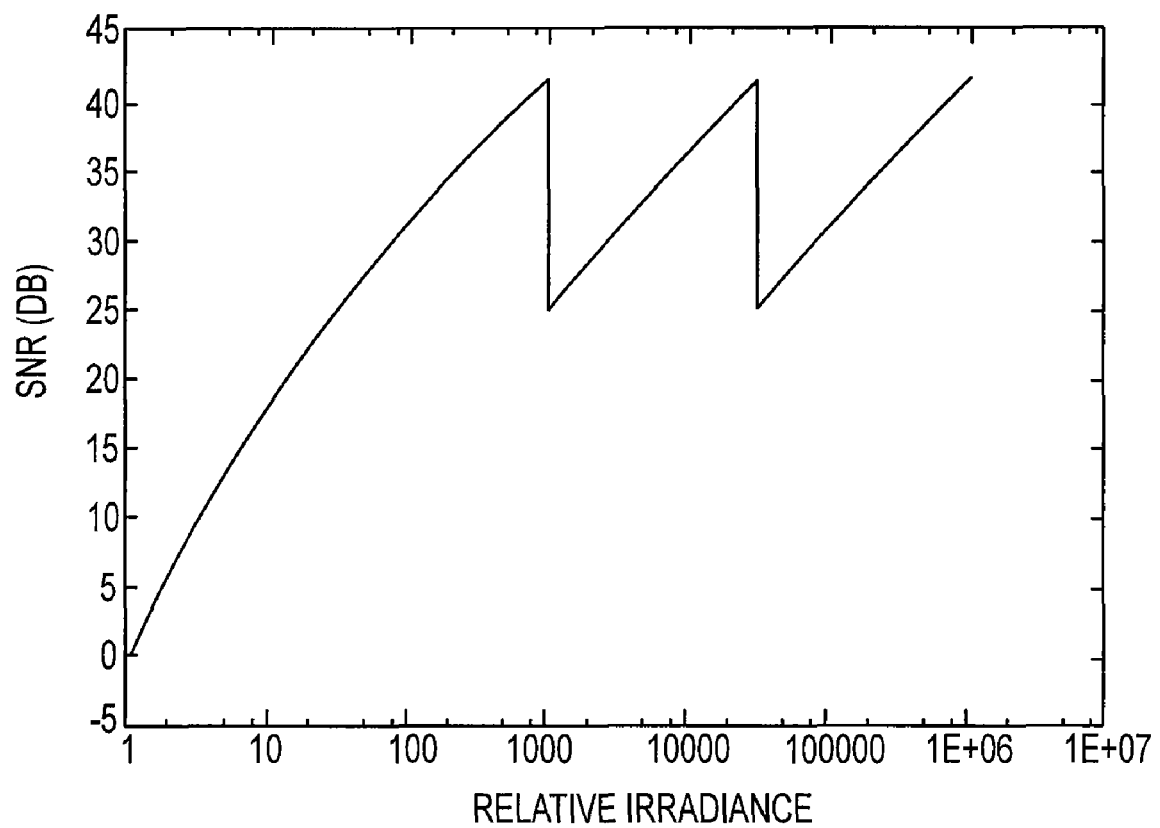
FIG. 8 depicts signal-to-noise ratio for a three-exposure embodiment.

As would be appreciated by those skilled in the art, such an embodiment will yield a $20*\log(1024)=\sim 60$ dB increase in dynamic range. The SNR benefits from the fact that there are three exposure times. If the merge/select function of the three exposures is degenerated to select only, the SNR as a function of the relative irradiance will appear as shown in FIG. 8. The troughs occur when a switch from one exposure to another takes place, and their value is $20*\log(32)=\sim 15$ dB. If a smooth merge function is applied, the dips may rounded, which may be desirable because abrupt changes in SNR may be discernible to the eye.

Having described several embodiments, it will be recognized by those of skill in the art that various modifications, alternative constructions, and equivalents may be used without departing from the spirit and scope of the invention. Additionally, a number of well known processes and elements have not been described in order to avoid unnecessarily obscuring the present invention. Accordingly, the above description should not be taken as limiting the scope of the invention, which is defined in the following claims.

What is claimed is:

1. A method of increasing a dynamic range of a captured image using a pixel array having a plurality of rows, the method comprising:
    reading first pixel information corresponding to a long integration period from each pixel of a first row;
    reading second pixel information corresponding to a short integration period from each pixel of the first row;
    converting the first read pixel information into digital form using a first analog to digital converter (ADC);
    converting the second read pixel information into digital form using a second ADC; and
    merging the first pixel information and the second pixel information to thereby produce wide dynamic range pixel information for each pixel of the first row;
    wherein the step of reading first pixel information takes place during a first interval,
    wherein the step of reading second pixel information takes place during a second interval,
    wherein at least a portion of the second interval takes place during a long integration period corresponding to a second row of the pixel array, and
    wherein the conversion of the second pixel information using the second ADC takes place in parallel with a conversion of third pixel information corresponding to the long integration period of the second row using the first ADC.

2. The method of claim 1, wherein at least a portion of the first interval takes place during the long integration period corresponding to the second row of the pixel array.

3. The method of claim 1, wherein merging the first pixel information and the second pixel information comprises:
    for each pixel, comparing the first pixel information to a predetermined threshold value;
    setting the wide dynamic range pixel information to be the first pixel information if the first pixel information is less than or equal to the threshold value; and
    setting the wide dynamic range of the pixel information to be a multiple of the second pixel information if the first pixel information is greater than the threshold value.

4. The method of claim 3, wherein the multiple is equal to a ratio of the long integration period to the short integration period.

5. The method of claim 1, wherein the pixel array comprises a CMOS array.

6. The method of claim 1, further comprising reading fourth pixel information corresponding to a medium integration period for each pixel of the first row, wherein the medium integration period takes place during a single line scan of the first row.

7. The method of claim 1, further comprising:
    storing the first pixel information in a line buffer after converting the first pixel information into digital form using a first analog to digital converter (ADC),
    wherein a difference between a start point of the conversion of the second read pixel information and a start point of the conversion of the first read pixel information is equal to a line scan period.

8. An image sensor, comprising:
    a pixel array having a plurality of rows, each row having a plurality of pixels;
    a controller configured to cause each pixel of each row to integrate first pixel information over a long integration period and second pixel information over a short integration period, wherein the controller is further configured to cause at least a portion of the short integration period for a row to take place during a long integration period of a second row;
    a first ADC configured to convert the first integrated pixel information into digital form;
    a second ADC configured to convert the second integrated pixel information into digital form, the second ADC being configured such that the second pixel information is integrated in parallel with third pixel information corresponding to the long integration period of the second row; and an arrangement configured to determine wide dynamic range pixel information for each pixel based on the first pixel information and the second pixel information.

9. The image sensor of claim 8, wherein the controller is further configured to cause at least a portion of the long integration period for the row to take place during the long integration period of the second row.

10. The image sensor of claim 8, wherein the arrangement configured to determine wide dynamic range pixel information for each pixel based on the first pixel information and the second pixel information is configured to determine wide dynamic range pixel information for each pixel based on the first pixel information and the second pixel information by:
   comparing the first pixel information to a predetermined threshold value;
   setting the wide dynamic range pixel information to be the first pixel information if the first pixel information is less than or equal to the threshold value; and
   setting the wide dynamic range of the pixel information to be a multiple of the second pixel information if the first pixel information is greater than the threshold value.

11. The image sensor of claim 10, wherein the multiple is equal to a ratio of the long integration period to the short integration period.

12. The image sensor of claim 8, wherein the pixel array comprises a CMOS array.

13. The image sensor of claim 8, wherein the controller is further configured to cause each pixel of each row to integrate fourth pixel information over a medium integration period wherein the medium integration period takes place during a single line scan of the first row.

14. An image sensor, comprising:
   means for reading first pixel information corresponding to a long integration period from each pixel of a first row;
   means for reading second pixel information corresponding to a short integration period from each pixel of the first row;
   means for converting the first read pixel information into digital form;
   means for converting the second read pixel information into digital form; and
   means for merging the first pixel information and the second pixel information to thereby produce wide dynamic range pixel information for each pixel of the first row;
   wherein the step of reading first pixel information takes place during a first interval,
   wherein the step of reading second pixel information takes place during a second interval, and
   wherein at least a portion of the second interval takes place during a long integration period corresponding to a second row of the pixel array, and
   wherein the conversion of the second pixel information takes place in parallel with a conversion of third pixel information corresponding to the long integration period of the second row.

15. The image sensor of claim 14, wherein at least a portion of the first interval takes place during the long integration period corresponding to the second row of the pixel array.

16. The image sensor of claim 14, wherein the means for merging the first pixel information and the second pixel information further comprises:
   means for comparing the first pixel information to a predetermined threshold value for each pixel;
   means for setting the wide dynamic range pixel information to be the first pixel information if the first pixel information is less than or equal to the threshold value; and
   means for setting the wide dynamic range of the pixel information to be a multiple of the second pixel information if the first pixel information is greater than the threshold value.

17. The image sensor of claim 16, wherein the multiple is equal to a ratio of the long integration period to the short integration period.

18. The image sensor of claim 14, wherein the pixel array comprises a CMOS array.

19. The image sensor of claim 14, further comprising means for reading fourth pixel information corresponding to a medium integration period for each pixel of the first row, wherein the medium integration period takes place during a single line scan of the first row.

* * * * *